United States Patent [19] [11] 3,871,384
Depauw et al. [45] Mar. 18, 1975

[54] REMOVABLE CONCAVE FOR AN AXIAL FLOW-TYPE COMBINE AND ADJUSTING MEANS THEREFOR

[75] Inventors: Richard A. Depauw; Robert W. Hawkins, both of East Moline, Ill.

[73] Assignee: International Harvester Company, Chicago, Ill.

[22] Filed: June 29, 1973

[21] Appl. No.: 375,250

[52] U.S. Cl. .............................. 130/27 T, 130/27 L
[51] Int. Cl. ............................................ A01f 12/20
[58] Field of Search ................ 130/27 T, 27 R, 27 L

[56] References Cited
UNITED STATES PATENTS
3,470,881  10/1969  Knapp et al. ...................... 130/27 T
FOREIGN PATENTS OR APPLICATIONS
600,735  7/1934  Germany ........................... 130/27 L
108,802  10/1939  Australia ........................... 130/27 T Primary Examiner—Louis G. Mancene
Assistant Examiner—J. N. Eskovitz
Attorney, Agent, or Firm—F. David AuBuchon; Floyd B. Harman

[57] ABSTRACT

A removable concave for the cylindrical rotor casing of an axial flow-type combine wherein the concave is held in an operative raised position within the rotor casing by means of a slide-out carrier upon which the concave rests and to which it is rigidly but removably secured. The carrier is suspended by an adjustable linkage, minor adjustments of which raise and lower the carrier to vary the effective position of the concave relative to the rotor casing axis. A terminal adjustment of the linkage, when accompanied by release of the carrier from the concave, lowers the concave to a position where the latter may be slid sidewise from the rotor casing and consequently from the combine. In its operative position in the rotor casing, the concave is circumferentially offset on one side of the vertical plane of the rotor casing axis to improve grain discharge.

7 Claims, 4 Drawing Figures

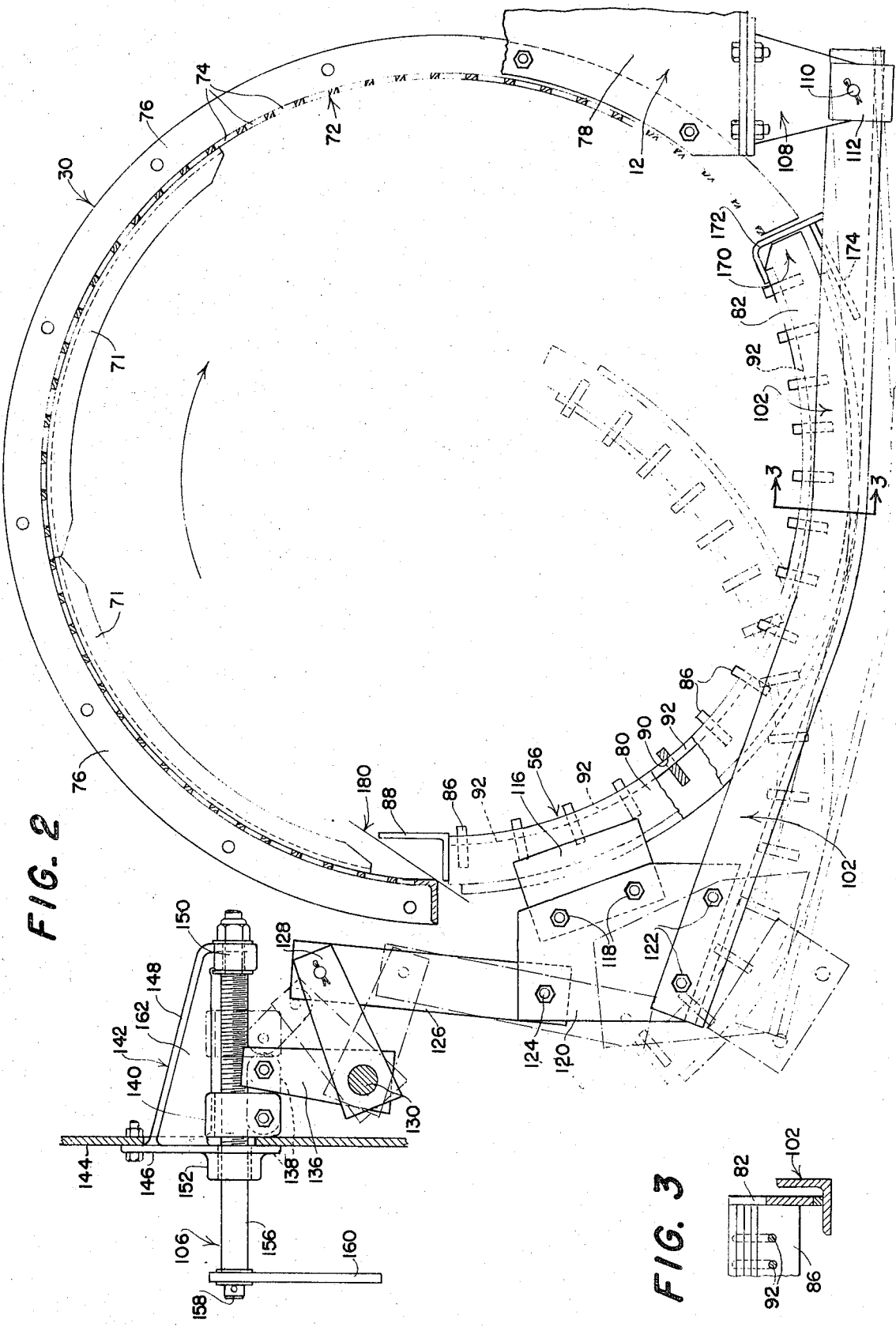

REMOVABLE CONCAVE FOR AN AXIAL FLOW-TYPE COMBINE AND ADJUSTING MEANS THEREFOR

The present invention relates generally to harvesting combines and has particular reference to that type of combine which is commonly referred to as an axial flow combine and wherein the crop material flows axially through an open-ended casing within which there is disposed a rotor. The invention is specifically concerned with an improved novel association of the threshing and separating concave with the casing whereby minor adjustements of the concave with the latter in situ may be effected, and also whereby, when desired, the concave may be removed bodily from the rotor casing, and consequently, from the combine, with a minimum of effort.

Heretofore, the latter in connection with axial flow-type combines, concave removal has presented numerous difficulties, most of which arise from the fact that it has been considered necessary to remove the concave from the front of the combine, thus necessitating removal of the crop feeder to afford clearance for passage of the combine endwise and forwardly from the combine. Additionally, the design or construction of conventional axial flow combines is such that the fastening bolts or other means whereby the concave is held in position within the rotor casing are not readily accessible and it is necessary for the operator to operate more or less within the confines of the combine body to gain access to such fastening means. Still further, since the operator is obliged to work in close quarters, there is little head room for him to manipulate the tools which are necessary to perform the unfastening procedure.

The present invention is designed to alleviate the aforementioned difficulty and, toward this end, it contemplates the provision of a novel concave and rotor casing assembly, together with a concave suspension arrangement, whereby the concave may be removed sidewise from the rotor casing, as well as from the combine, through a door which is provided in the side of the body portion of the combine, all the necessary operations being performed by an operator standing alongside the combine and without necessitating his climbing on the combine or entering the same. Since the concave is removed sidewise from the medial region of the combine, it is not necessary to disturb the connection between the crop feeder at the front end of the machine.

A further and similar limitation that is present in connection with axial flow combines resides in the difficulty of effecting minor adjustments of the position of the concave relative to the rotor casing, either for the purpose of altering the radial distance of the threshing surface of the concave from the rotating rotor blades, or to "square-up" the concave and render it parallel to the rotor axis. These difficulties are based upon the same constructional design features whereby the operator is afforded insufficient head room in which to work and which the present invention obviates by reason of the sidewise removal of the concave from the combine. Such difficulties are further based upon the fact that with either type of adjustment of the concave, whether to vary its radial position or to vary its angular position, it is obviously necessary to shut down the operation of the combine and partially dismantle the same to avoid injury to the operator while he is effecting the necessary adjustments.

According to the present invention, such adjustment difficulties are also obviated inasmuch as readily accessible adjusting means are provided at one side of the combine, these being well removed from the vicinity of the rotor casing, so that either type of adjustment of the position of the concave may be effected in situ, even while the combine is in operation if necessary.

A further novel feature of the present invention resides in the disposition of the concave at a particular circumferential region of the rotor casing of which it forms a part. Heretofore it has been the practice to position the arcuate concave in the threshing region of the rotor casing at the extreme bottom thereof where it is bisected by a vertical plane passing through the longitudinal axis of the casing. This results in an undesirable distribution of grain through the perforations in the concave. Due to the fact that the leading region of the concave, i.e., the region over which the rotating rotor blades initially sweep, will pass more grain than will the trailing region of the concave, there is a tendency for the discharged grain to pile up on one side of the grain pan, conveyor or other grain-receiving device beneath the concave. According to the present invention, by causing the concave to assume an offset position wherein it is shifted circumferentially approximately 30° in the trailing direction of the rotor, the trailing region of the concave is shifted upwardly on the circumference of the rotor casing where its vertical projection still lies within the two tangential planes at opposite sides of the cylindrical casing and, although a sparcity of grain, relatively speaking, passes through this trailing region of the concave, its vertical fall (projection) remains narrow and thus a more even over-all distribution of the discharged grain results.

The provision of a novel concave arrangement such as has been briefly outlined above, and possessing the stated advantages, constitutes the principal object of the present invention. Numerous other objects and advantages of the invention will readily suggest themselves as the following description ensues and the nature of the invention is better understood.

In the accompanying three sheets of drawings forming a part of this specification, one illustrative embodiment of the invention has been shown.

BRIEF DESCRIPTION OF THE DRAWINGS

FIG. 2 is an enlarged fragmentary sectional view taken substantially on the line 2—2 of FIG. 1 but with the threshing and separating rotor removed from the rotor casing, and with only adjacent fragments of the combine body portion or chassis being illustrated;

FIG. 3 is a sectional view taken on the line 3—3 of FIG. 2; and

Figure 1:
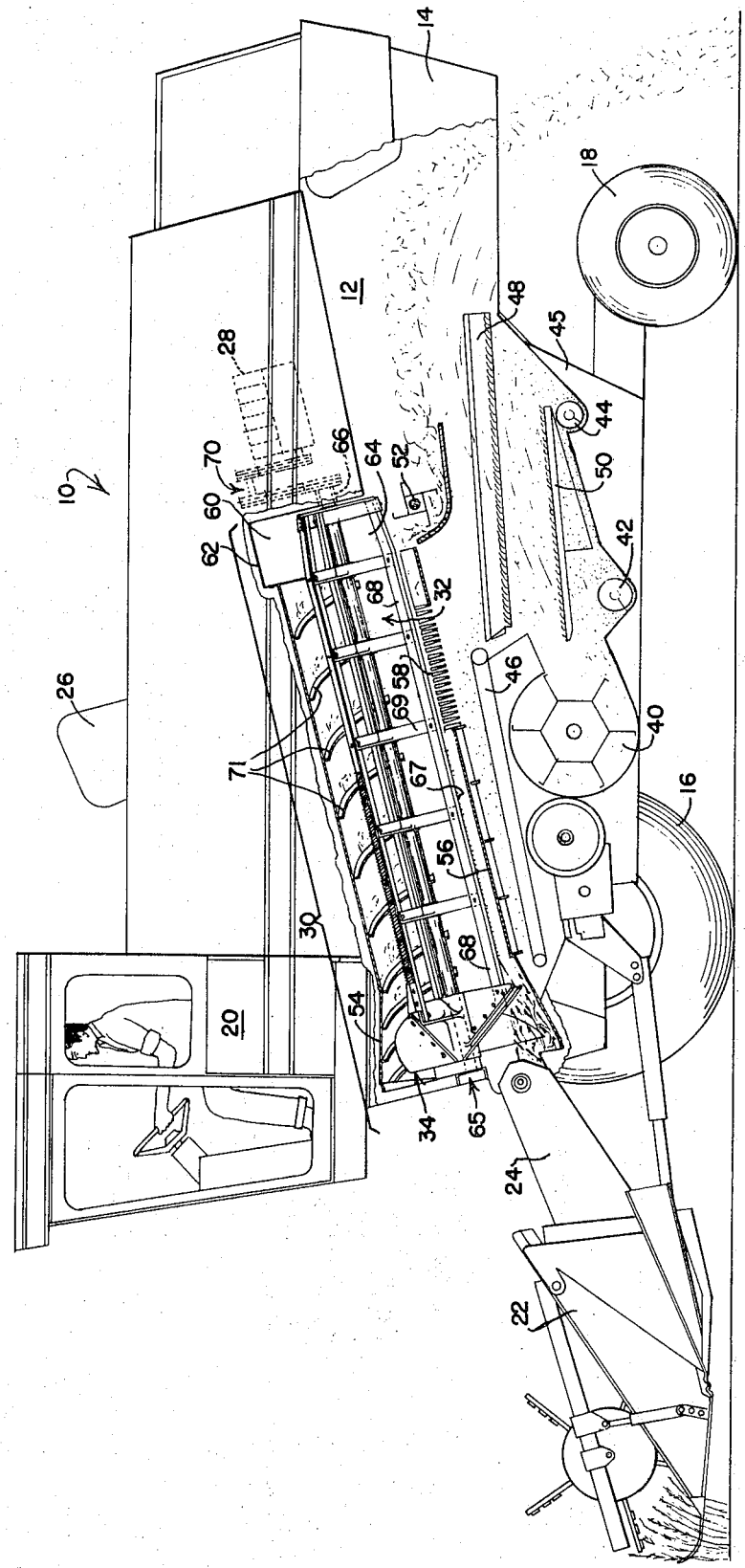
FIG. 1 is a side elevational view, largely schematic in its representation, of an axial flow-type combine embodying the principles of the present invention, a major portion of one side wall being removed to reveal the crop-gathering means, the crop-feeding means, the crop-impelling means, the axial threshing and separating means, the grain cleaning and handling means, and the residue discharge means.

Referring now to the drawings in detail and in particular to FIG. 1, an axial flow-type combine is designated in its entirety by the reference numeral 10, the combine being of the general type shown and described in U.S. Pat. No. 3,481,342, granted on Dec. 2, 1969 and entitled "Axial Flow-type Combine." The combine 10 involves in its general organization a chassis or body portion 12 having vertical side walls 14, the body portion being supported by a pair of relatively large drive wheels 16 in the front region of the combine, and a pair of steerable or dirigible wheels 18 at the rear of the combine. The combine further includes an operator's platform and cab 20, a crop-gathering header 22, a feeder 24, a grain elevator 26 and an engine 28. A grain tank (not shown) is enclosed within the walls of the body portion 12.

As is the case in connection with axial flow-type combines of the character under consideration, the axial threshing and separating means are embodied in a single unit in the form of an elongated and generally cylindrical member 30 in the form of a rotor casing having a rotor 32 mounted therein. The forward end of the rotor 32 carries a vaned impeller 34 of the helix type. Other conventional components not specifically related to the present invention, and which are more or less schematically disclosed herein, are the blower 40, grain auger 42 leading to the aforementioned grain elevator 26, and a tailings auger 44, these components being enclosed within a lower casing section 45 beneath the chassis or body portion 12. Enclosed beneath the cylindrical rotor casing and within the body portion 12 is an elongated generally flat endless conveyor 46 which receives separated grain from the concave and grate sections of such member and conducts such grain rearwardly for discharge onto a chaffer sieve 48. Such sieve is reciprocated in a fore and aft direction so as to pass grain and tailings to a grain sieve 50 which also is reciprocated to separate the grain from the tailings so that the grain passes through such sieve and into the grain auger 42 while the tailing are delivered rearwardly to the tailings auger 44. The grain in the auger 42 is delivered by elevator means 26 to the grain tank, while the tailings are returned to the rotor casing 30 by elevator means (not shown). A terminal beater 52 which is disposed beneath the rear end of the rotor casing 30 prepares the straw residue for discharge from the combine rearwardly thereof.

Still referring to FIG. 1, the elongated cylindrical rotor casing 30 extends along the longitudinal axis of the combine 10 and the forward end thereof is provided with a frusto-conical transition section 54 which is so termed because it represents a funnel-like entrance mouth by means of which material that is fed rearwardly from the feeder 24 in the form of a relatively wide mat is shrunk, so to speak, and caused to enter the remaining rearward portion of the rotor casing for threshing and separating functions which are performed within the casing upon the material.

The impeller 34 is provided with a vane arrangement which closely mates with the inner frusto-conical surface of the transition section 54. The material which enters the truly cylindrical portion of the casing 30 is processed as it travels forwardly, the threshed grain escaping from the casing through the apertured bottom which is made up of a concave 56 and a grate 58. The concave 56 is both adjustable and removable and the means whereby it may be thus adjusted and removed constitutes the subject matter of the present invention and will be described in detail subsequently. The straw and other waste material is conducted rearwardly from the separating region of the rotor casing 30 and enters an expansion chamber 60 which exists by reason of a discharge chute 62 which opens downwardly and provides a straw discharge outlet 64 in the lower region of the casing 30 at the extreme rear end thereof. The rotor 32 is rotatably journalled for operation within the rotor casing 30 and it is provided with a central axial rotor shaft 66 which has its forward end supported in a transverse bar 65 that constitutes a fixed component of the combine chassis 12. Rotor blades 68 extend longitudinally of the casing 30 and are carried on spiders 69 mounted on the rotor shaft 66 at spaced regions therealong. Conventional rasp bars 67 on the blades 68 cooperate with the concave 56 in the threshing region of the casing 30. A series of helical transport fins on the upper surface of the casing 30 function to index the material axially through the casing. The rotor shaft 66 is driven from the engine 28 by a suitable connection which may be in the form of a conventional Reeves drive mechanism 70.

The arrangement of parts thus far described, with the exception of the aforementioned adjustable and removable concave 56, is purely conventional and no claim is made herein to any novelty associated therewith, the novel of the invention residing rather in the association of the concave with the rotor casing 30 of which it constitues a part, the manner in which it is adjustable relative to the rotor 32, and the manner in which it may be removed from the casing 30 and also from the combine for purposes of inspection, repair or substitution, as will be described in detail presently.

Figure 4:
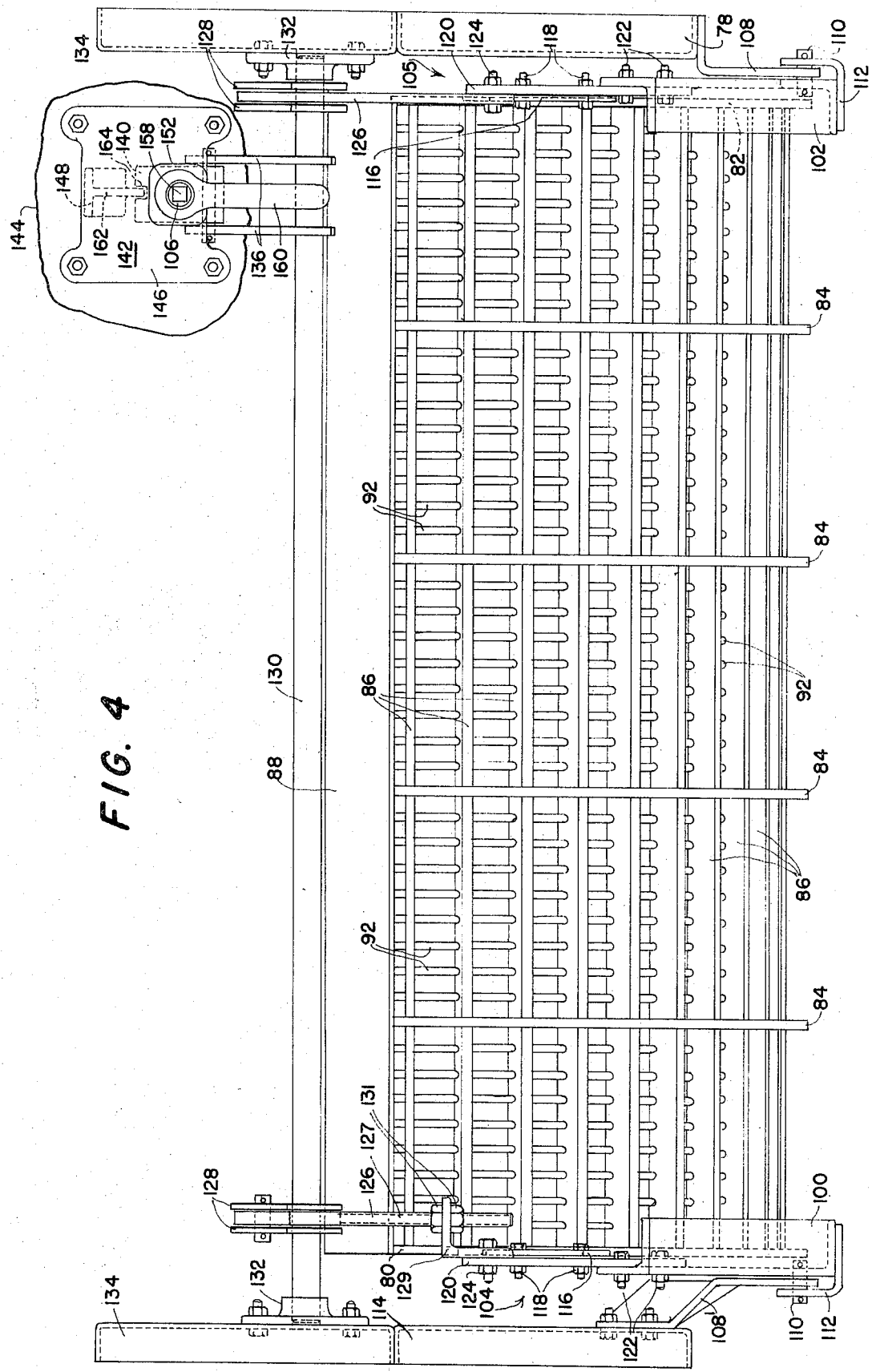
FIG. 4 is a left side elevational view of the structure shown in FIG. 2, the rotor casing being omitted so that this view discloses only the concave proper and its adjusting hanger mechanism.

Referring now to FIGS. 2, 3, and 4 wherein the removable concave 56 is illustrated only insofar as its association with the rotor casing 30 is concerned, the full line disclosure of such concave in FIG. 2 represents its operative position in the rotor casing 30, while the broken line position thereof is a schematic representation of the manner in which it may be removed from such rotor casing. The concave proper 56 is of more or less conventional construction and it consists of a generally arcuate frame-like member which defines the threshing section of the cylindrical rotor casing 30 and which normally assumes a position wherein it lies within the cylindrical contour of such casing, or nearly so. As will be described in detail presently, means are provided whereby limited radial adjustments of the concave 56 toward and away from the central axis of the casing 30 may be effected to alter the character of the threshing function which is performed upon varying types of crop, it being understood, of course, that such concave cooperates with the rasp bars 67 (FIG. 1) on the rotor 32 in the usual manner for threshing purposes. These adjustments are carried out manually and are made possible by the provision of a novel concave hanger or suspension system which also provides facilities whereby the concave may be released from the rotor casing and then pulled sidewise from the casing and thus completely removed from the combine through a side door (not shown) which is is associated with the body portion or chassis 12.

Considering first the character of the rotor casing 30, such casing with the exception of both the concave 56 and grate 58, in the main is comprised of a cylindrical sheet 72 (FIG. 2) having a multiplicity of closely spaced perforations 74 formed therein, the sheet being reinforced by a plurality of longitudinally spaced circular webs 76. In both the threshing region and the separating region of the rotor casing 30, the webs 76 and perforated sheet 72 are discontinued to accommodate the concave 56 and grate 58 which are set in place, so to speak, within the void which is thus created therefor. The rotor casing 30 is fixedly supported from the combine chassis or body portion 12, it being understood that it may be bolted at appropriate regions to adjacent chassis frame members, one such frame member 78 appearing in FIG. 2.

The arcuate frame-like concave proper 56 is generally of lattice-like construction and it involes in its general organizaiton a plurality of arcuate frame pieces including a pair of end pieces 80 and 82, and a series of medial frame pieces 84. A plurality of longitudinally extending frame bars 86 have their opposite ends welded to the end pieces 80 and 82. These bars traverse the medial frame pieces 84 and also are welded to the latter. An anglepiece 88 extends along the left hand edge of the frame-like concave and serves a purpose that will be made clear subsequently. As best shown in FIGS. 2 and 3, the frame bars 86 are formed with small holes 90 therein and a series of rods 92 extend through such holes and are removably held in this position, thus completing the perforate concave.

In the foregoing description, and in the description which follows, when referring to the frame-like concave 56 which (except for its curvature) is of rectangular configuration, the front and rear ends or end edges of the frame may be regarded as being defined by the arcuate pieces 80 and 82, while the sides or side edges of the frame may be regarded as being defined by the anglepiece 88 and, collectively the ends of the pieces 80 and 82 which are remote from the anglepiece 88. Also, in the following description, it should be borne in mind that whereas in FIG. 2, the concave 56 is shown in association with the rotor housing 30, in FIG. 4 it is shown as being isolated together with its adjusting mechanism, the rotor housing being omitted in the interests of clarity. Also, when considering FIG. 4, it is essential to understand that this view is a view looking forwardly through the rotor casing 30 with the entire rotor being removed, the direction of rotation of the rotor however being represented by the arrow in this view.

It is to be noted at this point that the concave 56 assumes a circumferential position within the confines of the rotor casing 30 which is offset toward the left side of the combine as viewed in FIG. 2. More specifically, the arcuate width of the concave is on the order of approximately 120° in arcuate extent. The concave, instead of being centered at the bottom of the rotor housing 30 as is conventional with most axial flow combines, is offset to the left by approximately 30 so that its right hand side edge assumes approximately a 5 o'clock position looking forwardly through the rotor casing, while its left side edge assumes approximately a 9 O'clock position. This circumferential offset of the concave constitutes an important feature of the present invention and, by reason thereof, threshing efficiency is improved as will become apparent when the threshing functions of the concave are described.

Still referring to FIG. 2, the concave 56 is cradled in a carrier assembly and is, to a large extent, supported on a pair of elongated support bars 100 and 102 which constitue elements of such carrier assembly and are in the form of anglepieces that extent beneath the concave and make tangential contact with the outside end pieces 80 and 82 (see FIG. 4). The two angelpieces are substantially identical in construction and each of them is pivoted at the right hand side of the combine for limited swinging movement in a vertical plane throughout a limited range of movement between the raised operative concave-retaining position in which it is shown in FIG. 2 in full lines, and the lowered concave-releasing position wherein it is shown in broken lines. The support bar 100 has associated therewith an articulated suspension linkage mechanism which is designated in its entirety by the reference numeral 104 and by means of which the left hand end thereof may be raised or lowered. A similar linkage mechanism 105 which is designed for the same purpose controls the raising and lowering of the left hand end of the support bar 102. The two linkage mechanisms 104 and 105 are simultaneously operable in unison under the control of a manually operable threaded hoisting screw or worm shaft 106. Inasmuch as the two support bars 100 and 102, and their respective suspension linkages 104 and 105 are substantially identical in construction, a description of one such bar and its linkage will largely suffice for the other.

The pivotal support for the right hand or proximate end of the support bar 102 comprises a right angle hanger or anglepiece 108 which depends from the aforementioned frame member 78 and which carries a pivot pin 110. The pivot pin passes through a swinging suspension bracket 112 which underlies the proximate end of the support bar 102 and it also passes through the vertical flange of the support bar. The pivotal support for the proximate end of the support bar 110 is similar to that described in connection with the support bar 102 and, therefore, in order to avoid needless repetition of description, identical reference numerals have been applied to the corresponding parts of the two pivotal supports, the only difference between them residing in the fact that the hanger for the support bar 100 is in the form of an offset bracket 108' which corresponds to the hanger 108, such bracket being affixed to a frame member or portion 114 of the combine chassis.

The articulated suspension linkage 105 embodies a rectangular attachment plate 116 which may be welded to the adjacent endpiece 82. Removably secured by bolts 118 to the plate 116 is a polygonal plate 120, the lower edge region of which is fastened by bolts 122 to the distal end region of the support bar 102. The upper end region of the plate is fastened by a bolt 124 to the lower end of a substanially vertical link 126. The upper end of the vertical line 126 is pivotally connected to the outer end of a dual crank arm 128, the inner end of such arm being fixedly secured to an elongated longitudinally extending rock shaft 130. The ends of the shaft 130 are pivoted in bearing brackets 132 which are bolted to frame members 134 associated with the combine chassis 12.

A second dual crank arm 136 has its inner end fixedly secured to the rock shaft 130 and the outer end of such crank arm is pivotally connected by a short floating link 138 which, in turn, is pivotally connected to a shiftable worm rack or crosshead 140 associated with a control housing 142. The housing 142 is mounted on a frame member 144 which constitutes a part of the combine chassis 12. The housing is in the form of a casting having an attachment plate 146 from which there projects inwardly a hood-like portion 148. The inner end of the hood-like portion 148 carries a bearing boss 150 while the attachment plate 146 carries a second bearing boss 152, the two bosses serving to rotatably support therebetween the aforementioned threaded worm shaft 106 on which the crosshead 140 is received. The worm shaft 106 is provided with an extension 156 which projects laterally at one side of the combine as shown in FIG. 2 and the outer end thereof is provided with a squared or non-circular end 158 for reception thereover of a suitable reversible ratchet tool 160 by means of which the worm shaft 106 may be rotated in either direction.

The hood portion 148 of the housing 142 is formed with a depending reaction web 162, while the upper side of the crosshead 140 is bifurcated so as to define a channel or trough within which the lower edge of the reaction web 162 projects. The function of the web 162 is to prevent turning movement of the crosshead 140 during rotation of the worm shaft 106 in either direction.

Normally, when the arcuate concave 56 is in its operative raised position as shown in full lines in FIG. 2, its left hand end region is fixedly maintained in place by means of the plate 116 which is welded to the concave, the disposition of such plate being a function of the position of the crosshead 140 along the worm shaft 106 as will be described presently. The right hand end region of the concave is also fixedly determined by the provision of a pocket-like recess 170 within which the right hand side of the concave is received and which is established by means of a hold-down member 172 which is welded to the support bar 102 and which has a flange that overlies the right hand end of the concave 56. A ramp piece 174 extends on an incline between the hold-down member 172 and bottom flange of the support bar and serves a function that will be set forth subsequently. The concave 56 is further rigidly maintained in its operative position by reason of the fact that the span of the concave which extends from its point of tangency with the support bar 102 to the plate 116, the span of the two plates 116 and 120, and the span of the support bar 102 which extends from such point of tangency to the plate 120 establish a rigid triangle when the two bolts 118 are in position on the plate 116 and 120.

The articulated suspension linkage 104 for raising and lowering the support bar 100 is, as previously stated, similar to the articulated suspension linkage 105 with the exception that it is capable of limited adjustment independently of the linkage 105 so that, when necessary, the concave as a whole may be "squared" and thus maintained in its proper circumferential relationship relative to the cylindrical rotor casing. Accordingly, in the linkage 104, the vertical link 126 which is associated with the linkage 105 is omitted and, in its place, a link 126' having a threaded section 127 is employed. The link 126' is connected to the plate 120 by an anglepiece 129 through which the threaded section 127 projects and to which it is adjustably connected by means of a pair of adjusting nuts 131. Otherwise, the linkage 104 remains the same as the linkage 105, both linkages being operable under the control of the rock shaft 130 which is common thereto.

When the concave is in its fully raised operative position as shown in full lines in FIG. 2, with the four bolts 118 in position on the plates 116 and 120, the crosshead 140 assumes a position wherein it is in close proximity to the frame 144 and, in such position, the dual crank arms 136 of both sets of bell crank levers assume substantially vertical positions while the dual crank arms 128 project laterally inwardly of the combine. These pairs of dual crank arms 136 and 128 consitute, in effect, bell crank levers. With the bolts 118 in position, the concave 56, support bars 100 and 102, and linkages 104 and 105 are locked in fixed positions due to the rigid triangle effect previously described. However, in order to remove the concave from the combine, withdrawal of the four bolts 118 will release the triangle and rotation of the worm shaft 154 and the proper direction will cause the crosshead 140 to move inwardly of the combine and away from the frame member 144, whereupon the bell crank arrangements 136, 128 will be rocked in a clockwise direction as viewed in FIG. 2, thus imparting a large downward component of movement to the outer ends of the crank arms 128 and lowering the vertical links 126, and plates 120. Such lowering of the plates 120 will swing the two support bars 100 and 102 about the axes of the pins 110 so that the concave 56 which is tangentially supported on such bars will shift bodily away from the central axis of the rotor casing 30. Since the right hand end of the concave 56 is captured, so to speak, within the pocket-like recess 170 which is afforded by the hold-down member 172, the concave 56 will swing bodily with the support bars 100 and 102 on which it rests in tangential fashion.

After the ratchet tool 160 has been actuated to bring the support bars 100 and 102, together with the concave 56 to their lowermost positions, the latter may be manually pulled to the left as viewed in FIG. 2 to withdraw the right side edge region thereof from the recess 170, after which the concave may be rocked on the support bars 100 and 102 and slide therealong and serviced in this position or removed from the combine.

Installation of the concave 56 in the rotor casing 30 may be accomplished by a reversal of the procedure outlined above and it will be noted that during projection of the right hand side of the concave into the recess or pocket 170, the ramp piece 174 assists in guiding the side of the concave 56 into the recess. After the concave has been thus projected into the recess 170, it may be rocked, so to speak, on the two support bars 100 and 102 to align the bolt holes in the plate 116 with the bolt holes in the plate 120, after which the bolts 118 may be installed. Such installation of the bolts will serve to rigidify the generally triangular structures which include the concave 56, support bars 100 and 102, and the plates 116, 120. Thereafter the worm shaft 154 may br rotated under the control of the ratchet tool 160 to shift the crosshead 140 toward the frame member 144, thereby actuating the two sets of articulated linkages 104 and 105 simultaneously so as to place the vertical link 126 under tension and raise the left side of the concave 56 until such time as the desired spacing of the latter from the cental axis of the rotor casing 30 is attained.

When the combine is in operation, the crosshead 140 will assume a position in close proximity to the frame member 144 as shown in FIG. 2. Thus, if it is desired to adjust the position of the concave 56 throughout a small angle to alter the threshing characteristics of the rotor 32, small increments of travel of the crosshead 140 on the worm shaft 154 may be effected in one direction or the other without removing the four bolts 118.

It is to be noted that the right hand side of the concave 56 receives a minor adjustment as compared to a major adjustment of the left hand side relative to the rotor axis as a result of movement of crosshead 140. It has been found that threshing efficiency may under certain circumstances be increased if the distance between the inside surface of the concave and the path of circumferential sweep of the rotor blades 68 gradually decreases in the trailing direction of such blades, thus establishing a drop-off region where the material undergoing threshing leaves the left side of the concave. Such drop-off region is indicated at 180 in FIG. 2. To insure such a decrease in radial distance regardless of the particular adjustment of the concave, the latter does not follow a true circular arc in its circumferential direction but, instead, is provided with a bend therein, this bend being present at approximately the plane where the section line 3—3 is taken. Thus, approximately the first one-third extent of the concave at the leading side thereof may follow the general cylindrical contour of the rotor casing 30, while the trailing two-thirds of the concave will "slant" inwardly, so to speak and establish the aforementioned drop-off region 180. The extent of such drop-off will, of course, be varied according to adjustments which may be made by shifting the position of the crosshead 140.

Insofar as the aforementioned circumferential offset of the concave is concerned, it has been found that a major portion of the threshing efficiency of the concave, i.e., maximum passage of grain through the perforate concave, takes place in the leading area of the latter. Thus, in order to equalize the passage of grain which falls through the concave and is received on the conveyor 46 (FIG. 1), and to prevent unequal "piling" of such grain in a large mound at the right hand side of the conveyor 46, the upward sweep of the trailing region or left hand side of the concave concentrates the reception of grain on the conveyor through this region and equalizes the distribution of grain which is received by the conveyor.

The invention is not to be limited to the exact arrangement of parts shown in the accompanying drawings or described in this specification as various change in the details of construction may be resorted to without departing from the spirit of the invention. Therefore, only insofar as the invention has particularly been pointed out in the accompanying claims is the same to be limited.

What is claimed is:

1. An axial flow combine having a chassis, an elongated longitudinally extending medially disposed cylindrical rotor casing supported on said chassis and embodying an arcuate section in the lower region thereof in the form of a perforate concave which defines an axially extending threshing region, a rotor designed for threshing cooperation with the concave the rotatable about the longitudinal axis of the casing, means for unidirectionally driving said rotor, said concave being movable bodily toward and away from the rotor through small increments of movement to vary the cooperating threshing characterisitics of the rotor and concave, a carrier projecting transversely across said chassis beneath the concave and having its proximate end pivoted to the chassis at one side thereof for swinging movement about a horizontal axis, means fixedly securing said concave to the carrier for movement bodily in unison therewith, and adjustable means effective between the distal end of the carrier and the chassis on the other side of the latter for raising and lowering the carrier.

2. An axial flow combine as set forth in claim 1, wherein the medial region of said carrier makes tangential contact with the underneath side of the concave in supporting relationship, and the concave is secured to the carrier at the distal end of the latter.

3. An axial flow combine as set forth in claim 2, wherein said means for fixedly securing the concave to the carrier is releasable to the end that, when released, the carrier serves to slidably support the concave.

4. An axial flow combine as set forth in claim 1 wherein said adjustable means for raising and lowering the carrier comprises a substantially vertically extending link having its lower end pivoted to the carrier, a bell crank supported from the chassis and having a generally horizontally extending arm pivoted at its outer end to the upper end of said link, and a substantially vertically extending arm, and a worm drive mechanism mounted on the chassis and connected to the outer end of said vertical arm.

5. An axial flow combine as set forth in claim 4, wherein said worm drive mechanism including a control housing on the chassis, a horizontal worm shaft rotatably carried by said housing, a crosshead threadedly mounted on the worm shaft for linear travel therealong, and a floating link pivoted at its opposite ends to said crosshead and the vertically extending arm of said bell crank.

6. An axial flow combine as set forth in claim 5, wherein said housing is provided with a reaction web which is disposed adjacent to and is coextensive with the worm shaft, and the crosshead is provided with means establishing a groove into which said web projects.

7. An axial flow combine as set forth in claim 1, wherein the medial region of said carrier makes tangetial contact with the underneath side of the concave in supporting relationship, the means for fixedly securing the concave to the carrier is releasable to the end that, when such means is released the carrier serves to slidably support the concave, and the side of the concave which opposes the direction of rotation of the rotor projects loosely into a recess which is provided on the adjacent edge of the rotor casing.

* * * * *